Patented Jan. 8, 1952

2,581,927

UNITED STATES PATENT OFFICE 2,581,927

CHLORINATION OF BUTADIENE POLYMERS AND COPOLYMERS

Raymond C. Briant, Baltimore, Md., assignor to The Firestone Tire & Rubber Company, Akron, Ohio, a corporation of Ohio No Drawing. Application April 14, 1949, Serial No. 87,583

9 Claims. (Cl. 260—96)

This invention relates to the chlorination of polymers of butadiene and copolymers thereof with minor proportions of other unsaturated compounds copolymerizable therewith.

With the advent of the synthetic elastomers based on butadiene, it was proposed to manufacture chlorinated products from these materials analogous to chlorinated rubber. However, it was found that the manufacturing techniques employed in the chlorination of natural rubber could not be transferred bodily to the chlorination of the synthetic elastomers. Specifically, carbon tetrachloride is the customary solvent for chlorination of natural rubber, since this solvent is cheap, is resistant to chlorination, and has boiling and solubility characteristics demanded by the hot water precipitation step in which the solution of chlorinated rubber is injected into hot water to flash off the solvent. However, carbon tetrachloride has been found unsuitable as a solvent for the chlorination of synthetic elastomers, because the incompletely chlorinated elastomer is precipitated therefrom during the latter stages of the chlorination and cannot be redissolved or further processed and utilized, see the German patent to Blomer 728,640, page 1, lines 17–21. Accordingly it has been necessary to employ, as the chlorination media, less desirable solvents such as ethylene dichloride, chloroform, dichloromethane, pentachloroethane, trichloroethane, tetrachloroethane, hexachloropropane, tetrachloroethylene and the like. These solvents have the disadvantages, inter alia, that they are susceptible to chlorination and are consumed during the process; are somewhat water-soluble and hence tend to be lost in the hot-water injection step; and in many cases have unfavorable boiling points for this process. Further, these solvents are difficultly removable from the chlorinated product. Moreover many of these solvents are relatively expensive.

Accordingly, it is an object of this invention to provide a process for the chlorination of synthetic polymers and copolymers of butadiene in which the disadvantages attending the use of the solvents ordinarily employed for this purpose are largely obviated.

Another object is to provide such a process employing chiefly carbon tetrachloride, together with relatively small proportions of other solvents, as the chlorination medium.

SYNOPSIS OF THE INVENTION

It has been discovered, by this invention, that a mixed solvent consisting of carbon tetrachloride together with small proportions of ethylene dichloride or of 1,1,2,2-tetrachloroethane is eminently suitable as a solvent medium for the chlorination of polymers and copolymers of butadiene. On the basis of the weight of the mixed solvent, the minimum amount of carbon tetrachloride to be employed in the solvent medium is 80%; the maximum varies between 87% and 91% in accordance with the type of copolymer employed as set forth in Table A hereinafter. The balance of the mixed solvent consists of ethylene dichloride, 1,1,2,2-tetrachloroethane (hereinafter this compound will be designated simply "tetrachloroethane") or mixtures of these two compounds in any proportion. Chlorinations of polymers and copolymers of butadiene in such mixed solvent media proceed smoothly to completion, without the irreversible precipitation of the partially chlorinated products which occurs when the chlorination is conducted in unmixed carbon tetrachloride. Loss of solvent by chlorination is neglible, due to the small net amount and dilution of the chlorine-unstable portion (ethylene dichloride and/or tetrachloroethane) of the solvent. The solution of chlorinated products produced by the chlorination step is readily amenable to the various precipitation processes which may be applied thereto, since the solvent has only the minimum necessary affinity for the chlorinated products.

THE BUTADIENE POLYMERS AND COPOLYMERS

The materials which may be chlorinated in accordance with this invention include the simple homopolymers of butadiene, and copolymers of butadiene consisting largely of the essential butadiene polymer chains interspersed at intervals with the residues of other unsaturated compounds copolymerized therewith. The copolymers should contain at least 75% of butadiene copolymerized therein, so as not to differ essentially from the homopolymers of butadiene. Unsaturated compounds which may be copolymerized with butadiene include for instance, vinyl compounds on the order of vinyl chloride, vinyl acetate, vinyl methyl ketone, vinyl ethyl ether, and the like; vinylidene compounds on the order of vinylidene chloride, isobutene and the like; acrylic compounds such as acrylonitrile, methacrylonitrile, ethyl acrylate and the like; maleic and fumaric compounds such as diethyl maleate, dimethyl fumarate, β-cyano methyl acrylate, maleodinitrile and the like; and conjugated unsaturated compounds such as isoprene, chloroprene, 2,3-dimethylbutadiene-1,3, piperylene, the methyl pentadienes, and the like. For a fuller list of compounds copolymerizable with butadiene, reference is made to Krczil-Kurzes Handbuch Der Polymerisationstechnik-Band II Mehrstoffpolymerisation, Edwards Brothers Inc., pages 655 and 656, the items under "Butadien."

The properties of the polymers and copolymers of butadiene vary somewhat with the conditions under which they were prepared. As a first approximation, and for the practical purposes of this invention, they may be characterized by their solution viscosities. Hereinafter, the "viscosity" given for any material or product will be the viscosity, in centipoises at 25° C., of a solution in toluene of that material containing 20% of the material, based on the weight of the solution. On this basis, the polymers and copolymers coming into consideration as starting materials for the practice of this invention will have viscosities varying from about 10 to about 1200.

THE SOLVENT MIXTURE

As noted above, the solvent mixtures employed in this invention consist of at least 80% of carbon tetrachloride, the balance being ethylene dichloride, tetrachloroethane, or any mixture of these two compounds. Set forth herewith in Table A, column B-1, are the maximum concentrations of carbon tetrachloride to be used in solvents for the chlorination of polymers or copolymers of butadiene of any given viscosity as set forth in column A:

Table A

| A | B | | C |
|---|---|---|---|
| Viscosity Range of Polymer Or Copolymer of Butadiene (cps. in 20% toluene solution) | Concentration of Carbon Tetrachloride In The Mixed Chlorination Solvent (per cent by weight of mixed solvent) | | Maximum Concentration of Butadiene Polymer or Copolymer (% by weight of the solution before chlorination) |
| | B-1 Maximum | B-2 Preferred | |
| 10-75 | 91 | 89 | 11 |
| 75-300 | 88 | 86 | 7 |
| 300+ | 87 | 85 | 3.5 |

From the table, it will be apparent that the maximum percentage of carbon tetrachloride permissible decreases as the viscosity of the butadiene polymer or copolymer increases. With any given polymer or copolymer, of course, the concentration of carbon tetrachloride may be reduced from the permissible maximum down to the minimum of 80%, the figure at which the advantages of the use of the mixed solvents of this invention over the conventional use of pure ethylene dichloride or tetrachloroethane come into play. Within this range, an optimum concentration of carbon tetrachloride is tabulated in column B-2 for the butadiene polymers and copolymers of the several viscosity ranges in column A.

The maximum concentration at which the solution of a given polymer or copolymer of butadiene should be made up for chlorination is also set forth in Table A, column C. It will be noted that the maximum permissible concentration varies inversely with the viscosity of the polymer or copolymer undergoing chlorination. The minimum concentration is determined primarily by economic considerations: ordinarily it will not be desirable to chlorinate solutions containing less than 0.75% by weight of the butadiene polymer or copolymer, because of the cost of the solvents and excessive equipment space required.

It will, of course, be desirable to operate as nearly as possible with the maximum proportion of carbon tetrachloride, and with the maximum concentration of butadiene polymer or copolymer, permitted as set forth in Table A, with an adequate safety factor to allow for errors in control to be expected in the particular plant. Operation with excessive quantities of carbon tetrachloride or of butadiene polymer or copolymer will result, during the latter stages of the chlorination, in the formation of a precipitate of partially chlorinated material which cannot be redissolved or further chlorinated and which is economically worthless. When operating at the border line, a slight, feathery precipitate or inhomogeneity will be observed towards the end of the chlorination step, but will disappear upon further chlorination.

THE CHLORINATION STEP

The unit process of chlorinating the solution in accordance with this invention consists in injecting chlorine gas into a solution having concentrations of components as set forth hereinabove. The rate of injections of chlorine is limited only by the rate at which the heat of reaction may be removed to keep the temperature within the desired range. In general, temperatures from 10° C. to 110° C. may be permitted during the chlorination step, with application of pressure in the ranges above the boiling point of the carbon tetrachloride in order to maintain the reaction mass in the liquid phase. It is preferred, however to operate in that portion of the range below about 35° C., as chlorinated products prepared at these lower temperatures have improved heat and light stability.

An after-treatment of the chlorinated product has also been found desirable, namely, permitting the chlorinated solution to stand for several hours saturated with chlorine in the presence of about 1% of iodine. Chlorinated products so prepared have greatly enhanced hydrolytic, heat, and light stability.

With the foregoing general discussion in mind, there are given herewith detailed examples of the practice of this invention. All parts given are by weight.

*Example I.—Medium viscosity polybutadiene*

| | Parts |
|---|---|
| Polybutadiene latex (containing 20% of polybutadiene dispersed therein; a 20% solution of the polybutadiene in toluene has a viscosity of 100 cps.; intrinsic viscosity=0.6) | 500 |
| Carbon tetrachloride: | |
| 1st portion | 400 |
| 2nd portion | 1240 |
| Ethylene dichloride | 260 |

The first portion of the carbon tetrachloride was agitated vigorously with the latex, in which it became emulsified within about a minute. Dilute hydrochloric acid was then added, whereupon the polybutadiene and carbon tetrachloride coagulated in the form of a pasty mass which separated and sank to the bottom, leaving a supernatant aqueous serum above. In about 10 minutes time, the phases were sufficiently well settled for decantation of the aqueous serum phase. The serum was then decanted, leaving the carbon tetrachloride-polybutadiene phase largely free of water.

The second portion of carbon tetrachloride and the ethylene dichloride were then added to the carbon tetrachloride-polybutadiene phase with stirring, whereby a smooth cement was obtained. The remaining traces of undissolved water were removed by heating the cement in a still, the solvents which distilled over being recycled to the still pot through a water trap. At the completion of the treatment (as evidenced by the absence of water in the solvent passing into the water trap) the cement contained less than 0.15% by weight of water dissolved therein.

The resultant cement was then subjected to chlorination in a glass-lined vessel provided with efficient cooling and stirring devices. Chlorine was introduced at the fastest rate at which it was possible to keep the temperature down to the range 30°–35° C. until the chlorination was complete, as evidenced by the refusal of the reaction mass to take up further quantities of chlorine at any substantial rate. In the apparatus employed, this required 55 to 65 minutes; however, the rate of introduction is limited only by the capacity of the cooling system, and the chlorine may be introduced much more rapidly if a more efficient cooling system is used. At no time during the chlorination was any difficulty encountered from the separation of insoluble materials from the reaction mass.

To the solution, saturated with the excess unreacted chlorine, was added 1.5 parts of iodine. The solution was then stored in a quiescent condition for 24 hours, at the end of which time the free chlorine and hydrochloric acid were removed by heating the solution gradually to 78° C. When the free chlorine was reduced to 0.08% by weight of the solution, the solution was injected into boiling water, which flashed off the solvent, leaving the chlorinated polybutadiene in granular form. The granular material was dewatered and washed on a filter, and dried. The product contained 57% of chlorine and a 20% solution thereof in toluene had a viscosity of 115 cps. The product was characterized by ready solubility in aromatic solvents, excellent heat, light and hydrolytic stability, and stable compatibility with alkyd resins.

*Example II.—Medium viscosity polybutadiene operation with minimum quantity of ethylene dichloride*

The procedure of Example I was exactly repeated down to the point at which the solution of chlorinated rubber was injected into hot water, with the exception that the amount of ethylene dichloride used was decreased to 220 parts and the second portion of carbon tetrachloride was increased to 1380 parts. The chlorination proceeded as before, except that, at approximately the halfway point of chlorination, a slight feathery inhomogeneity appeared in the solution, indicating that operations were being conducted substantially at the minimum operable proportion of ethylene dichloride. This inhomogeneity disappeared with further chlorination.

A portion of the resultant solution of chlorinated polybutadiene was injected into boiling water for recovery of the product as described in Example I. The product contained 56.0% of chlorine, and a 20% solution thereof in toluene had a viscosity of 135 centipoises. The product was also characterized by the same excellent application properties as the product of Example I.

Another portion of the solution of chlorinated polybutadiene was chilled to —10° C., which resulted in the precipitation of about 90% of all the chlorinated polybutadiene contained therein. The precipitated chlorinated polybutadiene contained 56.0% of chlorine and had a viscosity of 140 centipoises in 20% toluene solution.

*Example III.—High viscosity polybutadiene*

|  | Parts |
| --- | --- |
| Polybutadiene (a 20% solution of this material in toluene has a viscosity of 1000 cps., intrinsic viscosity 1.4) | 100 |
| Carbon tetrachloride | 4250 |
| Ethylene dichloride | 750 |

The foregoing ingredients were dissolved together and placed in a glass lined chlorination vessel. Chlorine was introduced over a period of 40 minutes, the temperature being kept throughout at 35°–45° C. No separation of phases was observed at any time. At the end of this time the solution ceased to absorb the chlorine at any substantial rate. One part by weight of iodine was then added to the solution which, still saturated with chlorine from the chlorination step, was stored in quiescent state for 24 hours. At the end of this time the solution was stripped of chlorine and hydrogen chloride, the chlorinated polybutadiene was isolated from the solution by injection into hot water as described in Example I. The product contained 57% of chlorine and the 20% solution thereof in toluene had a viscosity of 1100 centipoises.

*Example IV.—Low viscosity polybutadiene*

|  | Parts |
| --- | --- |
| Polybutadiene latex (containing 20% of polybutadiene dispersed therein: a 20% solution of the polybutadiene in toluene has a viscosity of 19 cps.) | 500 |
| Carbon tetrachloride: |  |
|   1st portion | 400 |
|   2nd portion | 712 |
| Ethylene dichloride | 138 |

A cement was prepared from the above ingredients by the procedure of Example I, and chlorine bubbled therethrough for about 1¾ hours, the temperature being maintained at about 40° C. throughout, at the end of which time spontaneous uptake of chlorine had ceased. No separation of phases was observed at any time. 1.5 parts of iodine were then added to the reaction mass, which still was saturated with chlorine, and which was then stored in quiescent state for 24 hours. The solution was then blown with inert gas to sweep out the unreacted chlorine and hydrogen chloride, and then mixed with 35% of its weight of methanol, whereupon the chlorinated polybutadiene separated from the solution in granular form. The polybutadiene was separated from the liquor by filtration, washed on the filter successively with methanol and with water, and dried. Chlorine content was 58%, viscosity of a 20% solution in toluene was 15 centipoises.

A procedure similar to the above was carried out, with the exception that the ethylene dichloride was reduced to 121 parts and the second portion of the carbon tetrachloride was increased to 729 parts. A slight inhomogeneity was observed at one stage of the chlorination, similarly as in Example II. Chlorine content of the product was 57%, viscosity of the 20% solution in toluene was 18 centipoises.

Example V.—Tetrachloroethane

The procedure of Example II was exactly repeated, using 1,1,2,2-tetrachloroethane in place of the ethylene dichloride, the other starting materials remaining the same. The phenomenon of slight inhomogeneity during the chlorination was again observed but cleared up very shortly. The product isolated by injecting the solution into hot water had a chlorine content of 56.5%, and the viscosity of its 20% solution in toluene was 110 centipoises.

Example VI.—Minimum tetrachloroethane-high viscosity polybutadiene

| | Parts |
|---|---|
| Polybutadiene latex (containing 30% of polybutadiene dispersed therein: 20% solution thereof in toluene has a viscosity of 875 centipoises, intrinsic viscosity 1.25) | 333 |
| Carbon tetrachloride: | |
| 1st portion | 400 |
| 2nd portion | 2500 |
| 1,1,2,2-tetrachloroethane | 433 |

Similarly as in Example I the latex and first portion of the carbon tetrachloride were vigorously agitated together until a smooth emulsion resulted. The emulsion was coagulated by addition of dilute hydrochloric acid, resulting in the separation of a doughy mass of solvent, polybutadiene, and very small amounts of entrained water. The supernatant aqueous serum was decanted, and the second portion of the carbon tetrachloride and the tetrachloroethane added, and stirred in to form a smooth cement. This cement was dehydrated by distillation, the distilled solvent being condensed, decanted from the entrained water, and refluxed to the cement until no separate aqueous phase appeared in the condensate.

The resultant solution was chlorinated at 45° C. At one point in the chlorination, a slight feathery precipitate appeared, but did not settle out and shortly redissolved. Chlorination appeared to be complete at the end of 1¼ hours, and the resultant chlorinated polybutadiene was isolated by injection into boiling water as in Example I. The product had a chlorine content of 58%, and its 20% toluene solution had a viscosity of 900 centipoises.

From the foregoing general discussion and detailed specific examples, it will be evident that this invention makes possible the chlorination of butadiene polymers in media comprising largely carbon tetrachloride with attendant lessened expense for initial solvent and loss of solvent by chlorination. The predominantly carbon tetrachloride chlorination media employed in this invention have more favorable properties for the precipitation processes used for the recovery of the product. The process may be carried out in inexpensive equipment, and with only a minimum of technical supervision.

What is claimed is:

1. Process which comprises injecting chlorine into a solution of an elastomer in a solvent selected from the group consisting of (a) mixtures of carbon tetrachloride with ethylene dichloride, (b) mixtures of carbon tetrachloride with 1,1,2,2-tetrachloroethane and (c) mixtures of carbon tetrachloride with ethylene dichloride and 1,1,2,2-tetrachloroethane, said solvent containing at least 80% of carbon tetrachloride and not more than the maximum percentages of carbon tetrachloride and of elastomer set out in Table A opposite the viscosity range of the elastomer, said elastomer being selected from the group consisting of polymers of butadiene and copolymers thereof with other unsaturated compounds copolymerizable therewith containing at least 75% of butadiene copolymerized therein.

2. Process which comprises injecting chlorine into a solution of an elastomer in a mixture of carbon tetrachloride and ethylene dichloride containing at least 80% of carbon tetrachloride by weight and not more than the maximum percentages of carbon tetrachloride and of elastomer set out in Table A opposite the viscosity range of the elastomer, said elastomer being selected from the group consisting of polymers of butadiene and copolymers thereof with other unsaturated compounds containing at least 75% of butadiene copolymerized therein.

3. Process which comprises injecting chlorine into a solution of an elastomer in a mixture of carbon tetrachloride and 1,1,2,2-tetrachloroethane containing at least 80% of carbon tetrachloride by weight and not more than the maximum percentages of carbon tetrachloride and of elastomer set out in Table A opposite the viscosity range of the elastomer, said elastomer being selected from the group consisting of polymers of butadiene and copolymers thereof with other unsaturated compounds containing at least 75% of butadiene copolymerized therein.

4. Process which comprises injecting, at about 35° C., chlorine into a solution of an elastomer in a solvent selected from the group consisting of (a) mixtures of carbon tetrachloride with ethylene dichloride, (b) mixtures of carbon tetrachloride with 1,1,2,2-tetrachloroethane and (c) mixtures of carbon tetrachloride with ethylene dichloride and 1,1,2,2-tetrachloroethane, said solvent containing at least 80% of carbon tetrachloride and not more than the maximum percentages of carbon tetrachloride and of elastomer set out in Table A opposite the viscosity range of the elastomer, said elastomer being selected from the group consisting of polymers of butadiene and copolymers thereof with other unsaturated compounds copolymerizable therewith containing at least 75% of butadiene copolymerized therein.

5. Process which comprises injecting, at about 35° C., chlorine into a solution of an elastomer in a mixture of carbon tetrachloride and ethylene dichloride containing at least 80% of carbon tetrachloride by weight and not more than the maximum percentages of carbon tetrachloride and of elastomer set out in Table A opposite the viscosity range of the elastomer, said elastomer being selected from the group consisting of polymers of butadiene and copolymers thereof with other unsaturated compounds containing at least 75% of butadiene copolymerized therein.

6. Process which comprises injecting, at about 35° C., chlorine into a solution of an elastomer in a mixture of carbon tetrachloride and 1,1,2,2-tetrachloroethane containing at least 80% of carbon tetrachloride by weight and not more than the maximum percentages of carbon tetrachloride and of elastomer set out in Table A opposite the viscosity range of the elastomer, said elastomer being selected from the group consisting of polymers of butadiene and copolymers thereof with other unsaturated compounds containing at least 75% of butadiene copolymerized therein.

7. Process which comprises injecting chlorine into a solution of polybutadiene in a solvent selected from the group consisting of (a) mixtures of carbon tetrachloride with ethylene dichloride, (b) mixtures of carbon tetrachloride with 1,1,2,2-tetrachloroethane, and (c) mixtures of carbon tetrachloride with ethylene dichloride and 1,1,2,2-tetrachloroethane, said solvent containing at least 80% of carbon tetrachloride therein and not more than the maximum percentages of carbon tetrachloride and of polybutadiene set forth in Table A opposite the viscosity range of the polybutadiene found in column A of Table A.

8. Process which comprises injecting chlorine into a solution of polybutadiene in a mixture of carbon tetrachloride and ethylene dichloride containing at least 80% of carbon tetrachloride and not more than the maximum percentages of carbon tetrachloride and of polybutadiene set forth in Table A opposite the viscosity range of polybutadiene found in column A of Table A.

9. Process which comprises injecting, at about 35° C., chlorine into a solution of polybutadiene in a mixture of carbon tetrachloride and ethylene dichloride containing at least 80% of carbon tetrachloride and not more than the maximum percentages of carbon tetrachloride and of elastomer set forth in Table A opposite the viscosity range of polybutadiene found in column A of Table A.

RAYMOND C. BRIANT.

REFERENCES CITED

The following references are of record in the file of this patent:

UNITED STATES PATENTS

| Number | Name | Date |
| --- | --- | --- |
| 2,292,737 | Blomer et al. | Aug. 11, 1942 |
| 2,352,525 | Evans | June 27, 1944 |
| 2,503,252 | Ernsberger | Apr. 11, 1950 |

FOREIGN PATENTS

| Number | Country | Date |
| --- | --- | --- |
| 728,640 | Germany | Dec. 1, 1942 |

OTHER REFERENCES

Endres: "Derivatives of Synthetic Rubber," The Rubber Age, July, 1944, vol. 55, No. 4, pp. 361–366.